US006377900B1

(12) United States Patent
Ueno et al.

(10) Patent No.: US 6,377,900 B1
(45) Date of Patent: Apr. 23, 2002

(54) MEASURING SYSTEM FOR TRANSFER FUNCTION MATRIX OF A SYSTEM TO BE CONTROLLED IN MULTI-DEGREE OF FREEDOM VIBRATION CONTROL

(75) Inventors: Kazuyoshi Ueno, Nishinomiya; Yoshikado Yamauchi, Osaka, both of (JP)

(73) Assignee: IMV Corporation, Osaka (JP)

( * ) Notice: Subject to any disclaimer, the term of this patent is extended or adjusted under 35 U.S.C. 154(b) by 0 days.

(21) Appl. No.: 09/304,669

(22) Filed: May 4, 1999

(30) Foreign Application Priority Data

May 12, 1998 (JP) ............................................ 10-128767

(51) Int. Cl.$^7$ ............................................. G01M 19/00
(52) U.S. Cl. .................... 702/109; 702/109; 324/76.27; 318/632
(58) Field of Search ................................ 702/196, 109, 702/126, 35; 324/76; 701/37; 318/632

(56) References Cited

U.S. PATENT DOCUMENTS

| 5,168,213 A | * 12/1992 | Wardle et al. ............ 324/76.27 |
| 5,477,453 A | * 12/1995 | Harashima .................... 701/37 |
| 5,528,119 A | * 6/1996 | Rundqwist et al. .......... 318/632 |
| 5,610,843 A | * 3/1997 | Chou .......................... 702/109 |
| 6,199,019 B1 | * 3/2001 | Iino et al. ..................... 702/35 |

* cited by examiner

*Primary Examiner*—Arthur T. Grimley
*Assistant Examiner*—Mohamed Charioui
(74) *Attorney, Agent, or Firm*—Nixon Peabody LLP; Donald R. Studebaker

(57) ABSTRACT

A measuring system for measuring a transfer function matrix of a system to be controlled by applying sine-wave excitations to a test object simultaneously by multiple number of vibrators. In the measuring system, when sine-wave signals for driving multiple number of vibrators are generated, phases between the sine-wave signals are shifted randomly, first, and then multiple number of vibrators are excited simultaneously under the generated sine-wave signals. Then, an auto-spectrum and a cross-spectrum for one calculation are calculated from spectral data on a vibration frequency obtained from an analysis of excitation signals and response signals acquired during the excitations. These steps are repeated two or more times to calculate the auto-spectra and cross-spectra for two or more calculations, followed by arithmetically averaging these spectrums to find a mean value of the auto-spectra and a mean value of the cross-spectra, so that the transfer function matrix at a specific frequency is calculated from the both mean values. The steps up to this point are repeated at each frequency to calculate said transfer function matrix data at all frequency components. This can allow the same sine-wave signals and the same vibration condition as in a multi-degree of freedom sine-wave vibration test to be used in the test, for measuring the transfer function matrix of the system to be controlled with adequate accuracy.

8 Claims, 7 Drawing Sheets

MEASURING SYSTEM FOR TRANSFER FUNCTION MATRIX OF A SYSTEM TO BE CONTROLLED IN MULTI-DEGREE OF FREEDOM VIBRATION CONTROL

BACKGROUND OF THE INVENTION

The present invention relates to a measuring system for measuring a transfer function matrix of a system to be controlled in a multi-degree of freedom vibration test or vibration control on a test object excited by multiple number of vibrators of a vibration testing apparatus.

In general, in this multi-degree of freedom vibration control, transfer function matrix of a system to be controlled must be determined in advance of the test. The measurements of each element of the transfer function matrix can roughly be classified into the following groups.

① Classification by excitation methods:

An individual excitation method: a method in which vibrators are each individually excited to measure a column elements of the transfer function matrix; and A simultaneous excitation method: a method in which vibrators are all simultaneously excited to measure all the elements of the transfer function matrix at once.

② Classification by excitation signals:

Random signals; and

Sine-wave signals.

Of these classifications, the simultaneous excitation method using the random signals and the individual excitation method using random signals or sine-wave signals have been used hitherto to measure the transfer function matrix, but the simultaneous excitation method using sine-wave signals has never been used.

When comparison is made among the measurements of the transfer function matrix by the known methods on measuring time and a matter of protection of the vibration testing apparatus, the following evaluation is given.

① Measuring time:

The measurement of the transfer function matrix which is performed in advance of the actual test should preferably be made in minimal measuring time, in consideration of the influence over a test object and the operating time for the test. The individual excitation method in which vibrators are each individually excited to measure the transfer function matrix is lack of practical utility in that the more the vibrators increases, the more time it takes. When comparison on the measuring time for the transfer function matrix is made between the measurement using random signals and the measurement using sine-wave signals, the measurement using random signals generally needs a shorter measuring time.

Figure 8:
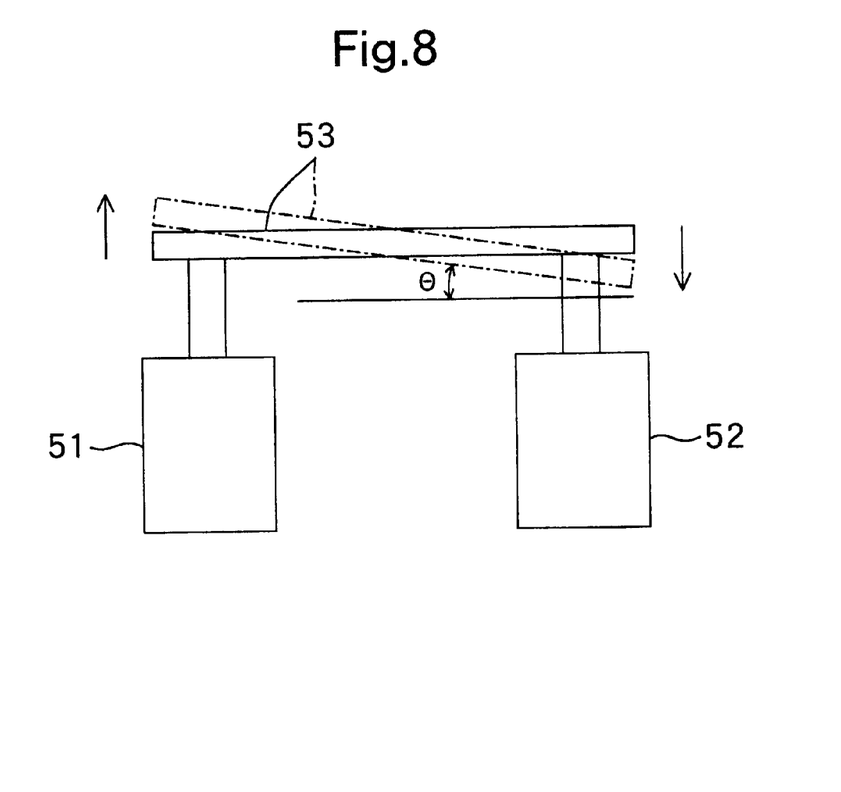
FIG. 8 is a schematic diagram for illustrating a vibration adjustment in a known simultaneous excitation method.

② The matter of protection of the vibration testing apparatus:

In the individual excitation method, no consideration can be taken of the influence on other vibrators caused by an operation of one vibrator, for the reason of which the vibration testing apparatus may possibly be damaged. On the other hand, in the simultaneous excitation method, the vibration signals of the vibrators can be adjusted to take consideration of the influences on the mutual vibrators so that possible damage to the vibration testing apparatus is to be avoided. For example, when a test object 53 is simultaneously excited by two vibrators 51, 52, as shown in FIG. 8, the excitation can be adjusted so that the angle θ of the test object 53 not to exceed a predetermined angle limitation.

In consideration of the measuring time and the matter of protection of the vibration testing apparatus, the simultaneous excitation method using random signals can generally be said to be the best method of the known measuring methods and is widely in practical use.

A brief description is given here on the method of measuring the transfer function matrix by means of the simultaneous excitation using random signals.

Figure 9:
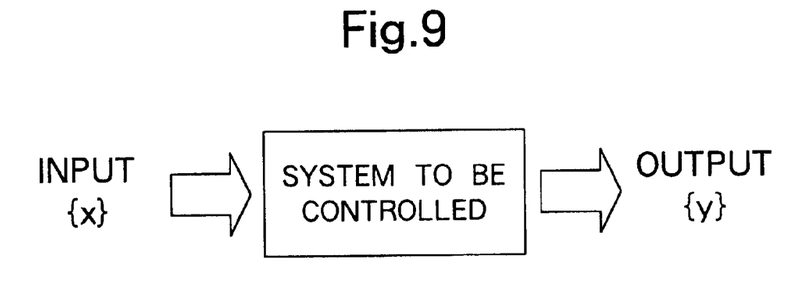
FIG. 9 is a schematic diagram showing the relation between the input signal wave vector and the output signal wave vector for the system to be controlled.

As shown in FIG. 9, an input signal waveform vector to a system to be controlled (comprising of each signal for driving each vibrator) is denoted as $\{x\}$ and an output signal waveform vector from the system to be controlled (comprising of each response signal at each control point) is denoted as $\{y\}$.

The relation among $\{X\}$, $\{Y\}$ and H is expressed by the following equation (1):

$$H\{X\}=\{Y\} \qquad (1)$$

where $\{X\}$ is an input signal spectral vector which is the converted input signal vector in the frequency-domain by use of FFT (Fast Fourier Transformation) or equivalent; $\{Y\}$ is an output signal spectral vector; and H is a transfer function matrix of the system to be controlled.

When both sides of the equation (1) are multiplied by the transposed vector of the complex conjugate of the vector $\{X\}$, the following equation (2) is obtained.

$$H\{X\}\{\bar{X}\}^T=\{Y\}\{\bar{X}\}^T \qquad (2)$$

The left side of the equation (2) is the auto-spectrum matrix of the input signal and the right side thereof is the cross-spectrum matrix between the input signal and the output signal. When these are expressed as $S_{xx}$ and $S_{xy}$, the equation (2) can be rewritten as the following equation (3).

$$HS_{xx}=S_{xy} \qquad (4)$$

Thus, the transfer function matrix H can be expressed by the following equation (4).

$$H=S_{xy}S^{-1}_{xx} \qquad (4)$$

where $S^{-1}_{xx}$ is the inverse matrix of $S_{xx}$.

In the equation (4), the existence of the inverse matrix $S^{-1}_{xx}$ is required to calculate the transfer function matrix H, and as such requires that $S_{xx}$ be a regular matrix.

Supposing that the components of the input signal vector are random signals having no correlation, averaging of $S_{xx}$ allows the components having no correlation other than diagonal components to approach zero in the averaged $S_{xx}$, and thus the averaged $S_{xx}$ results in a diagonal matrix. Since a diagonal matrix is a regular matrix, the existence of the inverse matrix is ensured.

Likewise, averaging process of $S_{xy}$ allows the components having no correlation between the input signals and the output signals to approach zero in the averaged $S_{xy}$, and thus influences from other input signals can be eliminated from the relation between the specific input signals and the response signals.

Thus, the measurement of the transfer function matrix by means of the simultaneous excitation using random signals can be obtained by applying random signals having no correlation to the vibrators to excite the vibrators two or more times, followed by averaging the results.

Incidentally, a sine-wave vibration test that sine-wave excitations are simultaneously applied from the vibrators is sometimes conducted as a multi-degree of freedom vibration test. In this sine-wave vibration test as well, the transfer function matrix of a system to be controlled had to be measured hitherto by using random signals excitation which is different in nature from those in the vibration state in the actual test, that is done by the sine-wave excitation. As a result of this, an adequate accuracy sometimes could not be obtained. This can often be revealed particularly in a system to be controlled such as employing hydraulic actuators having strong nonlinear characteristics.

In the vibration test that uses the information of the transfer function matrix of the system to be controlled, the controllability and thus the test performance is dependent on the accuracy of the measured transfer function matrix of the system to be controlled. Because of this, it is generally preferable for improvement of the test performance to measure the transfer function matrix in the same vibration condition as in the actual test. In view of this, when a multi-degree of freedom vibration test is conducted for the system to be controlled having a strong nonlinear characteristic, it is preferable that the transfer function matrix is measured by use of the same nature signal as in the test, i.e., sine-wave signal, in the same vibration condition as in the test, i.e., in the simultaneous vibration.

When the transfer function matrix is measured with multiple number of vibrators excited simultaneously, influences from other input signals must be eliminated for judgment of the effect on a response point from a specified vibrator. However, in the case of the excitation signals being sine-wave signals, it is difficult to do so, because sine-wave signals themselves are correlative signals. It is the existing situation that the measurement of the transfer function matrix of the system to be controlled in the simultaneous excitation method using sine-wave signals is not practiced even in today's state of art.

SUMMARY OF THE INVENTION

After having conducted devoted researches, the inventors have newly developed the method that when multiple number of vibrators are excited simultaneously, the effect exerted on a response point from a specified vibrator can be judged by shifting phases of the sine-wave signals for driving the vibrators randomly, as in the case of random signals being used as excitation signals. It is the object of the invention to provide a measuring system for a transfer function matrix of a system to be controlled in multi-degree of freedom vibration control which enables the transfer function matrix to be measured with adequate accuracy, based on this method.

To accomplish the above object, the present invention provides a measuring system for measuring a transfer function matrix of a system to be controlled by simultaneous excitation using sine-wave signals prior to a vibration test on a test object is conducted by use of multiple number of vibrators, the measuring system comprising a sine-wave signal generating part in which when the sine-wave signals for driving multiple number of vibrators are generated, the phases between the sine-wave signals are randomly shifted; at least one sensor for acquiring response signal at a response point when multiple number of vibrators are simultaneously excited under the sine-wave signals generated in the sine-wave signal generating part; a spectrum calculating part for calculating an auto-spectrum and a cross-spectrum for one calculation from the spectral data on a vibration frequency obtained from an analysis of the sine-wave signals(i.e., excitation signals) and the response signals acquired by sensors; a spectrum storing part in which the auto-spectrum and the cross-spectrum calculated in the spectrum calculating part are stored in sequence; an arithmetic mean processing part in which the auto-spectra and the cross-spectra for two or more calculations stored in sequence in the spectrum storing part are each arithmetically averaged to find a mean value of the auto-spectra and a mean value of the cross-spectra; a transfer function matrix calculating part in which a transfer function matrix at a specific frequency is calculated from the mean value of the auto-spectra and the mean value of the cross-spectra as found in the arithmetic mean processing part; and a transfer function matrix data storing part in which the transfer function matrix data at specific frequencies calculated in the transfer function calculating part are stored in sequence, to calculate the transfer function matrix at all frequency components.

In the measurement of the transfer function matrix of the system to be controlled by means of the simultaneous excitation using sine-wave signals prior to the vibration test on the test object being conducted by use of multiple number of vibrators, the following steps are taken. First, when sine-wave signals for driving multiple number of vibrators are generated, the phases between the sine-wave signals are randomly shifted and then multiple number of vibrators are simultaneously excited under the generated sine-wave signals. Then, the auto-spectrum and the cross-spectrum for one calculation are calculated from the spectral data on the vibration frequency obtained from the analysis of the excitation signals and the response signals acquired during the excitation. These steps are repeated two or more times to calculate the auto-spectra and cross-spectra for two or more calculations, followed by arithmetically averaging them to find a mean value of the auto-spectra and a mean value of the cross-spectra. Then, the transfer function matrix at a specific frequency is calculated from the both mean values. The foregoing steps are repeated at each frequency to calculate the transfer function matrix at all frequency components.

The discussion is given here on the significance of the random phase shift of the sine-wave signals. In the known method of measuring the transfer function by simultaneous excitation using random signals, the conversion of random signals from time-domain data into frequency-domain data via the Fourier transformation means that the time-domain data is resolved into the sine-wave signals of two or more frequencies. This means that random signals having no correlation with each other randomly vary in phase on a frequency domain at certain spectral components (frequencies). Thus, the random shift of the phases of sine-wave signals can be considered as an extraction of specific spectral component of the random signals having no correlation.

It is understood from this consideration that in the inventive simultaneous excitation method using sine-wave signals as well, the transfer function matrix can be measured on the same principle as in the simultaneous excitation method using random signals. However, in the simultaneous excitation using random signals, the frequency components over the entire range of frequencies can be handled at one excitation, while on the other hand, in the inventive simultaneous excitation method using sine-wave signals, the transfer function matrix at only a particular frequency component can be measured at one excitation, and as such need repeat the excitation at each of the frequencies, to measure the transfer function matrix at all frequency components. From this point, the inventive simultaneous excitation method using sine-wave signals is effective for the measurements in which the transfer function matrix of the system to be controlled need be measured with adequate accuracy prior to the multi-degree of freedom vibration test using sine waves.

BRIEF DESCRIPTION OF THE DRAWINGS

These and other objects and advantages of the invention will become more apparent upon a reading of the following detailed description and drawings, in which.

DETAILED DESCRIPTION OF THE PREFERRED EMBODIMENTS

Referring now to the accompanying drawings, examples of the preferred embodiments of the present invention will be described below.

Figure 1:
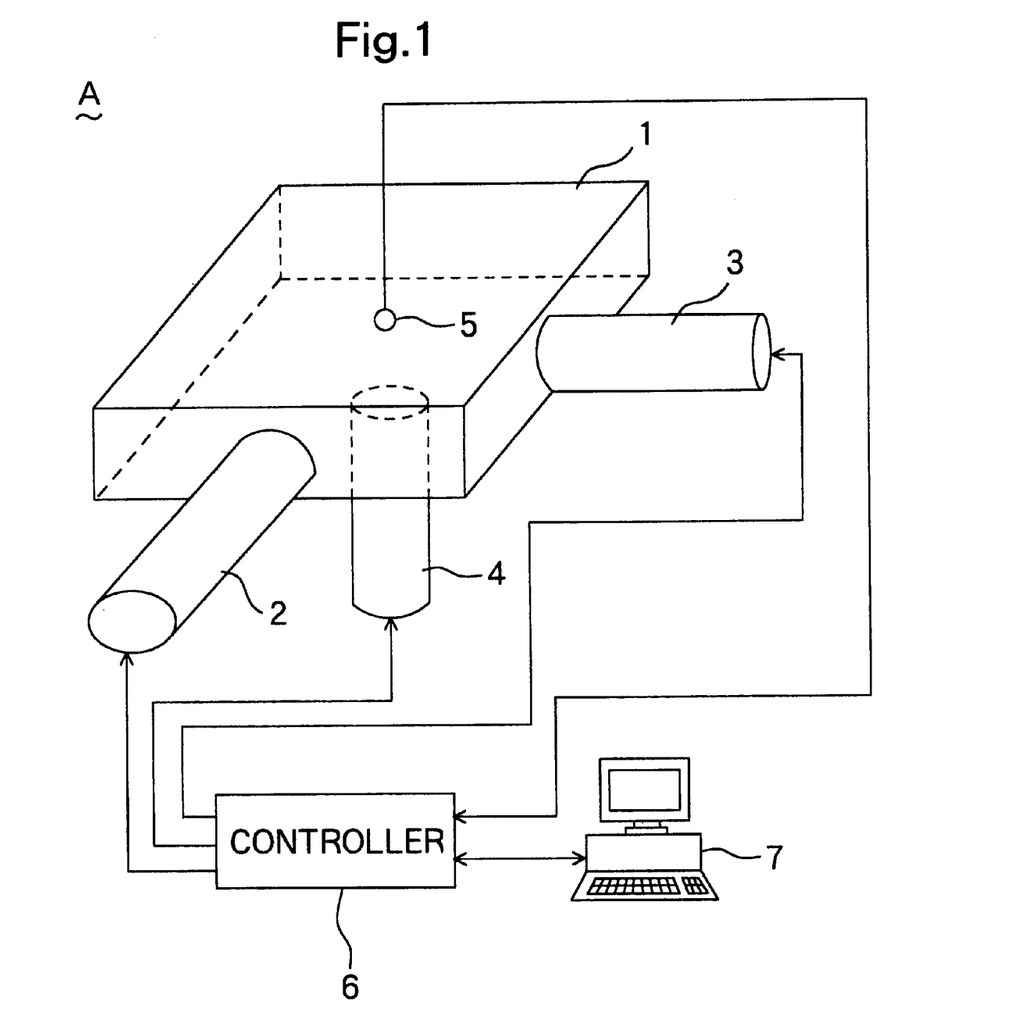
FIG. 1 is a schematic construction diagram of a vibration testing apparatus according to the first embodiment of the invention.

FIG. 1 shows a schematic construction of a vibration testing apparatus A according to the first embodiment of the invention. The vibration testing apparatus A comprises three vibrators 2, 3, 4 for applying vibrations to a test object 1 in the directions of the three axes orthogonal to each other; a vibration sensor 5 provided at a predetermined point on the test object 1; a controller 6 for receiving response signals from the vibration sensor 5 to control the vibrators 2–4; and a personal computer 7 connected with the controller 6 in a signal receivable relation. Though the vibration sensor 5 is provided at only one location on the test object 1 in the illustrated embodiment, two or more vibrators 5 may be provided at two or more locations, when necessary. Also, not only the vibrations in the uniaxial direction but also the vibrations (response signals) in the triaxial directions at each of those points (response points) may be acquired for measurement.

The controller 6 has the function as a measuring system for measuring a transfer function matrix of a system to be controlled prior to the sine-wave vibration test in which the sine-wave excitations are simultaneously applied to the test object 1 by the three vibrators 2–4. The construction of the part having this function is shown in FIG. 2.

Figure 2:
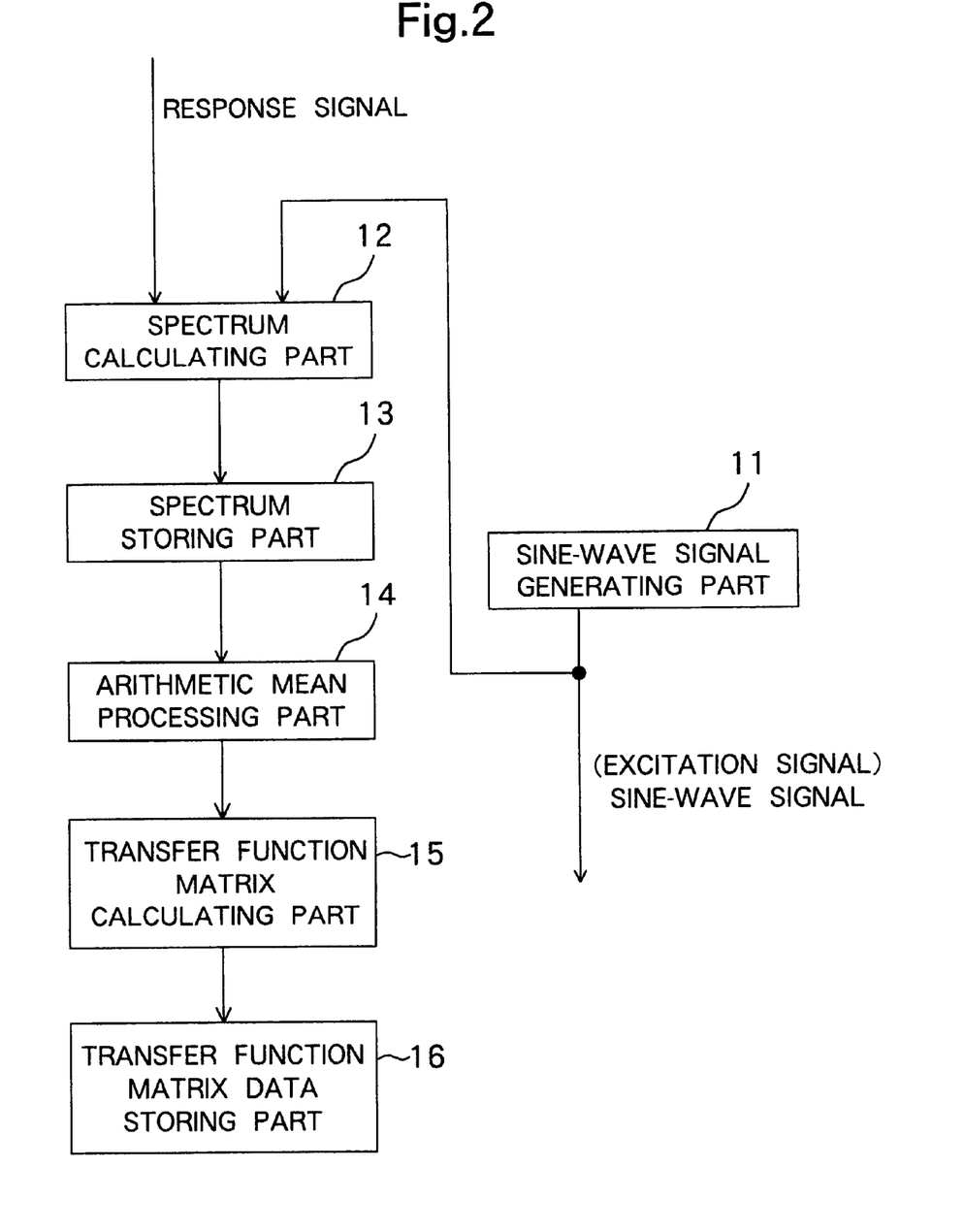
FIG. 2 is a block construction diagram of a part of a controller of the vibration testing apparatus having the function as a measuring system for a transfer function matrix.

In FIG. 2, numeral 11 designates a sine-wave signal generating part for generating sine-wave signals of excitation signals of the vibrators 2–4. In the sine-wave signal generating part 11, when the sine-wave signals for the vibrators 2–4 are generated, the phases between the sine-wave signals are randomly shifted. Numeral 12 designates a spectrum calculating part in which the excitation signals of the sine-wave signal generating part 11 and the response signals acquired by the vibration sensor 5 are each converted into frequency-domain data via the Fourier integral or equivalent, to calculate an auto-spectrum and a cross-spectrum for one calculation. Numeral 13 designates a spectrum storing part in which the auto-spectrum and the cross-spectrum calculated in the spectrum calculating part 12 are stored in sequence. Numeral 14 designates an arithmetic mean processing part in which the auto-spectra and the cross-spectra for two or more calculation as stored in sequence in the spectrum storing part 13 are arithmetically averaged to find a mean value of the auto-spectra and a mean value of the cross-spectra. Numeral 15 designates a transfer function matrix calculating part in which a transfer function matrix at a specific frequency (which is equal to the frequency of the sine-wave signal at the excitation of the vibrators 2–4) is calculated from the mean value of the auto-spectra and the mean value of the cross-spectra as found in the arithmetic mean processing part 14. Numeral 16 designates a transfer function matrix storing part in which the transfer function matrix at specific frequencies calculated in the transfer function matrix calculating part 15 are stored in sequence to calculate the transfer function matrix at all frequency components.

Figure 3:
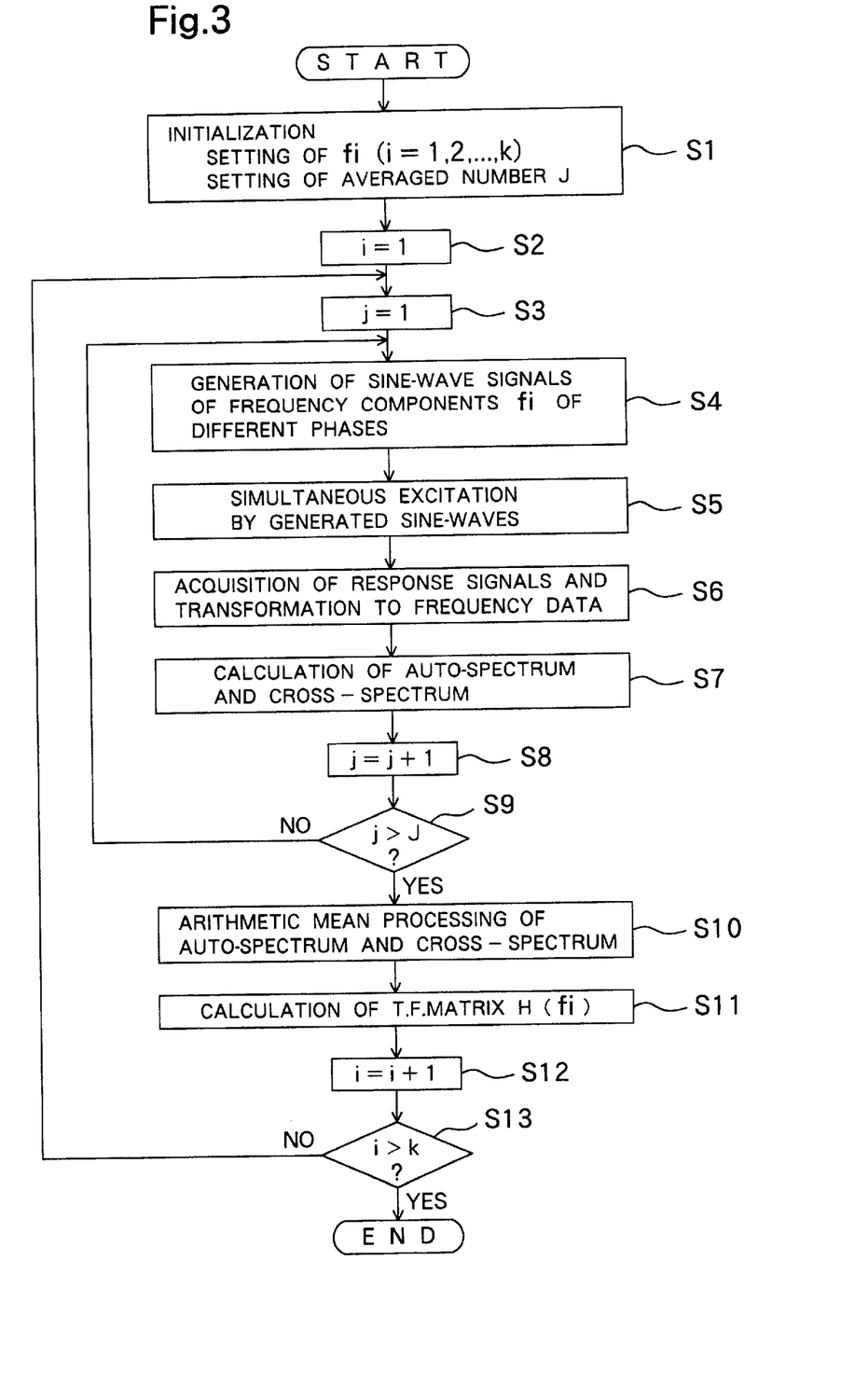
FIG. 3 is a flow sheet showing the method of measurement of the transfer function matrix.

Referring now to the flow sheet shown in FIG. 3, description will be given on the measuring steps for measuring the transfer function matrix of the system to be controlled in the controller 6, prior to the sine-wave vibration test in which the sine-wave excitations are simultaneously applied to the test object 1 by the three vibrators 2–4.

First of all, the setting of measuring frequency series $f_i$ ($i=1–k$) and the setting of averaged number J of the transfer function matrix measurements are performed for initialization (Step 1). These settings are carried out by the input from the keyboard of the personal computer 7. The setting of the measurement frequency series $f_i$ is performed at each predetermined frequency interval in the range of frequencies requiring the transfer function matrix. The smaller the frequency intervals, the higher the measuring accuracy becomes. In the setting of the averaged number J of the transfer function measurements, the more the averaged number J, the higher the measuring accuracy becomes, while the longer the measuring time becomes.

Subsequently, the sine-wave signals of the vibrators 2–4 are generated (Step 4). At that time, the phases of the sine-wave signals are randomly shifted. Each of the input signals $x_{ij}{}^n$ (j=1,2,3) at the frequency $f_i$ [Hz] at the n-th vibration in the measurements of the transfer functions can be expressed as the following equation (5).

$$X_{i1}{}^n(t)=A\sin[2\pi f_i t+\theta_{i1}{}^n]$$

$$X_{i2}{}^n(t)=A\sin[2\pi f_i t+\theta_{i2}{}^n]$$

$$X_{i3}{}^n(t)=A\sin[2\pi f_i t+\theta_{i3}{}^n] \quad (5)$$

where t is time; A is an amplitude of the input sine-wave signal; and $\theta_{ij}{}^n$ is a phase at the n-th vibration of the j-th input signal.

The random phase shift of the sine-wave signals means that the three $\theta_{ij}$ (j=1,2,3) are varied within the specified range ($2\pi$ at the maximum). According to the present invention, the sine-waves of the input signals may be shifted in phase relative to each other, and the sine-wave used as a reference for phase may be a fictitious one or a specific input signal. The phase shift range may then be limited not to damage the vibration testing apparatus A.

Figure 4:
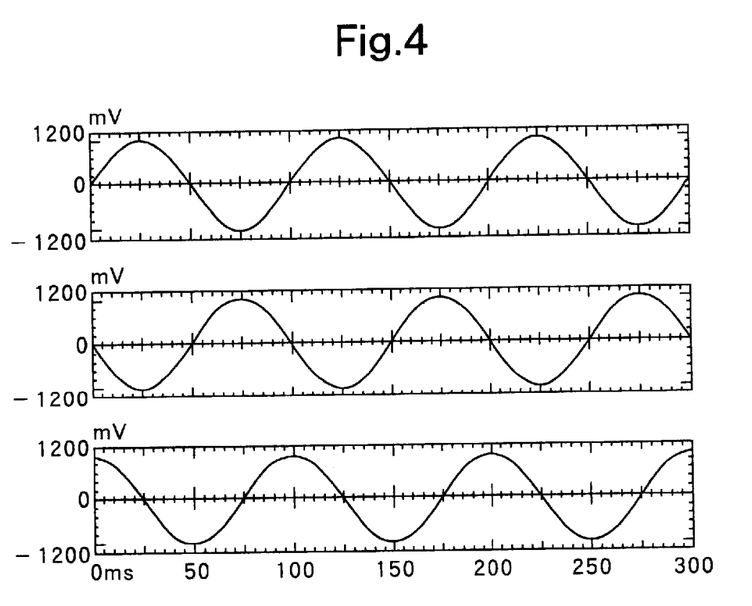
FIG. 4 is a waveform diagram showing input signals at the first excitation.

FIG. 4 shows one example of the input signals $x_{ij}{}^1$ (j=1, 2,3) at the frequency $f_i$ [Hz] at the 1st excitation. In this diagram, for the sake of simplicity, the 1st sine wave $x_{i1}{}^1$ (top in the diagram) is set to be a reference sine-wave and the phase $\theta_{i1}{}^1$ is set to be zero. The phase $\theta_{i2}{}^1$ of the 2nd sine-wave signal (middle in the diagram) is set to be $\pi$, and the phase $\theta_{i3}^1$ of the 3rd sine-wave signal (bottom in the diagram) is set to be $\pi/2$.

Then, the vibrators 2–4 are simultaneously excited under these input signals (Step 5). The response signals at the response point at the vibration are acquired by the vibration sensor 5 and also the 1st auto-spectrum $S_{ixx}^1$ of the input signal and the 1st cross-spectrum $S_{ixy}^1$ between the input signal and the output signal are calculated on the basis of the input signal and the output signal (Steps 6, 7). In the calculation of the auto-spectrum $S_{ixx}^1$ and the cross-spectrum $S_{ixy}^1$, the input signal wave vector and the output signal wave vector which are the time-domain data are first converted into frequency-domain data via the Fourier integral or equivalent, to determine the input signal spectrum vector and the output signal spectrum vector. Subsequently, the input signal spectrum vector is multiplied by the transposed vector of its complex conjugate vector, to determine the auto-spectrum matrix $S_{ixx}^1$, and the output signal spectrum vector is multiplied by the transposed vector of the complex conjugate vector of the input signal spectrum vector, to determine the cross-spectrum matrix $S_{ixy}^1$.

Then, the input sine-wave signal $x_{ij}^2$ (j=1,2,3) at the frequency $f_i$ at the 2nd excitation is generated. The phase $\theta_{i2}^2$ of the 2nd sine-wave signal at the 2nd excitation and the phase $\theta_{i3}^2$ of the 3rd sine-wave signal at the 2nd excitation may be any value except zero, as long as they are different from each other within the specified range ($2\pi$ at the maximum) (in other words, they are different from the phase $\theta_{i1}^2$ of the 1st sine-wave signal which is the reference sine-wave signal) and also they are each different from the 1st value ($\theta_{i2}^1$ or $\theta_{i3}^1$).

Figure 5:
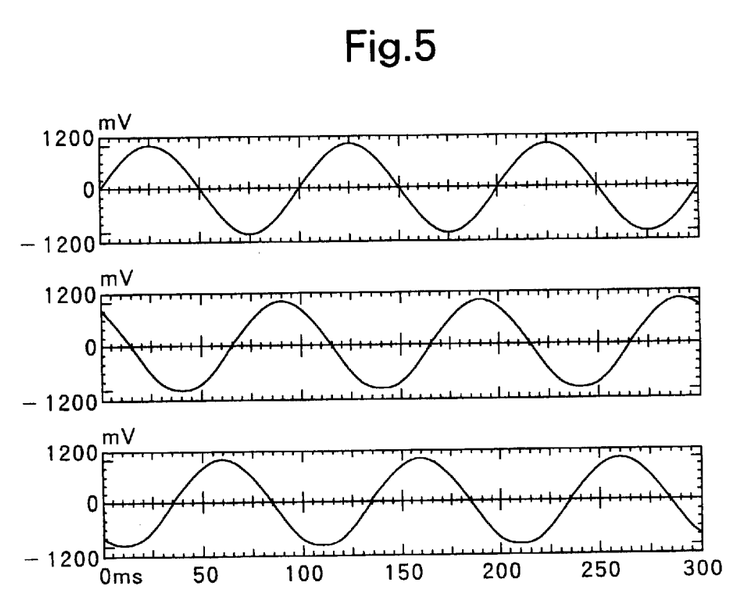
FIG. 5 is a waveform diagram showing input signals at the second excitation.

FIG. 5 shows one example of the input signals $x_{ij}^2$ at the frequency $f_i$ at the 2nd excitation. In this diagram, the phase $\theta_{i2}^2$ of the 2nd sine-wave signal is set to be $2\pi/3$, and the phase $\theta_{i3}^2$ of the 3rd sine-wave signal is set to be $4\pi/3$.

Then, the vibrators 2–4 are simultaneously excited under these input signals, to calculate the 2nd auto-spectrum $S_{ixx}^2$ of the input signal and the 2nd cross-spectrum $S_{ixy}^2$ between the input signal and the output signal.

These steps (Steps 4 to 7) are repeated at the averaged number J of times, to calculate the auto-spectra of the input signals and the cross-spectra between the input signals and the output signals for the averaged number J of calculations. The phase $\theta_{i2}^n$ of the sine-wave signal to the 2nd vibrator and the phase $\theta_{i3}^n$ of the sine-wave signal to the 3rd vibrator at each excitation must take values other than zero and different from each other within the specified range ($2\pi$ at the maximum) and different in terms of random numbers at each excitation.

Then, after completion of the measurements of the averaged number of times, the obtained auto-spectra $S_{ixx}^n$ n and cross-spectra $S_{ixy}^n$ (n=1,2, . . . , J) for the averaged number of calculations are arithmetically averaged to find the mean value $S_{ixx}^M$ of the auto-spectra and the mean value $S_{ixy}^M$ of the cross-spectra by the following equation (6) (Step 10).

$$S_{ixx}^M = \frac{1}{J}\sum_{n=1}^{J} S_{ixx}^n \qquad (6)$$

$$S_{ixx}^M = \frac{1}{J}\sum_{n=1}^{J} S_{ixx}^n$$

Subsequently, the both mean values $S_{ixx}^M$ and $S_{ixy}^M$ are substituted into the following equation (7) to find the transfer function matrix $H(f_i)$ at the frequency $f_i$ (Step 11)

$$H(f_i) = S_{ixy}^M S^{-1}{}_{ixx}^M \qquad (7)$$

where $S^{-1}{}_{ixx}^M$ is the inverse matrix of $S_{ixx}^M$.

The steps up to this point are repeated at each frequency $f_1$(i=1,2, . . . k) to calculate the transfer function matrix data at all frequency components.

The thus-calculated transfer function matrix of the system to be controlled are measured by using the same sine-wave signals as in the sine-wave vibration test and in the same simultaneous excitation conditions. Thus, when used in the control of the sine-wave vibration test in which the sine-wave excitations are simultaneously applied to the test object 1 by the three vibrators 2 to 4, the transfer function matrix can be ensured with adequate accuracy, to contribute to improvement of the vibration test accuracy.

Figure 6:
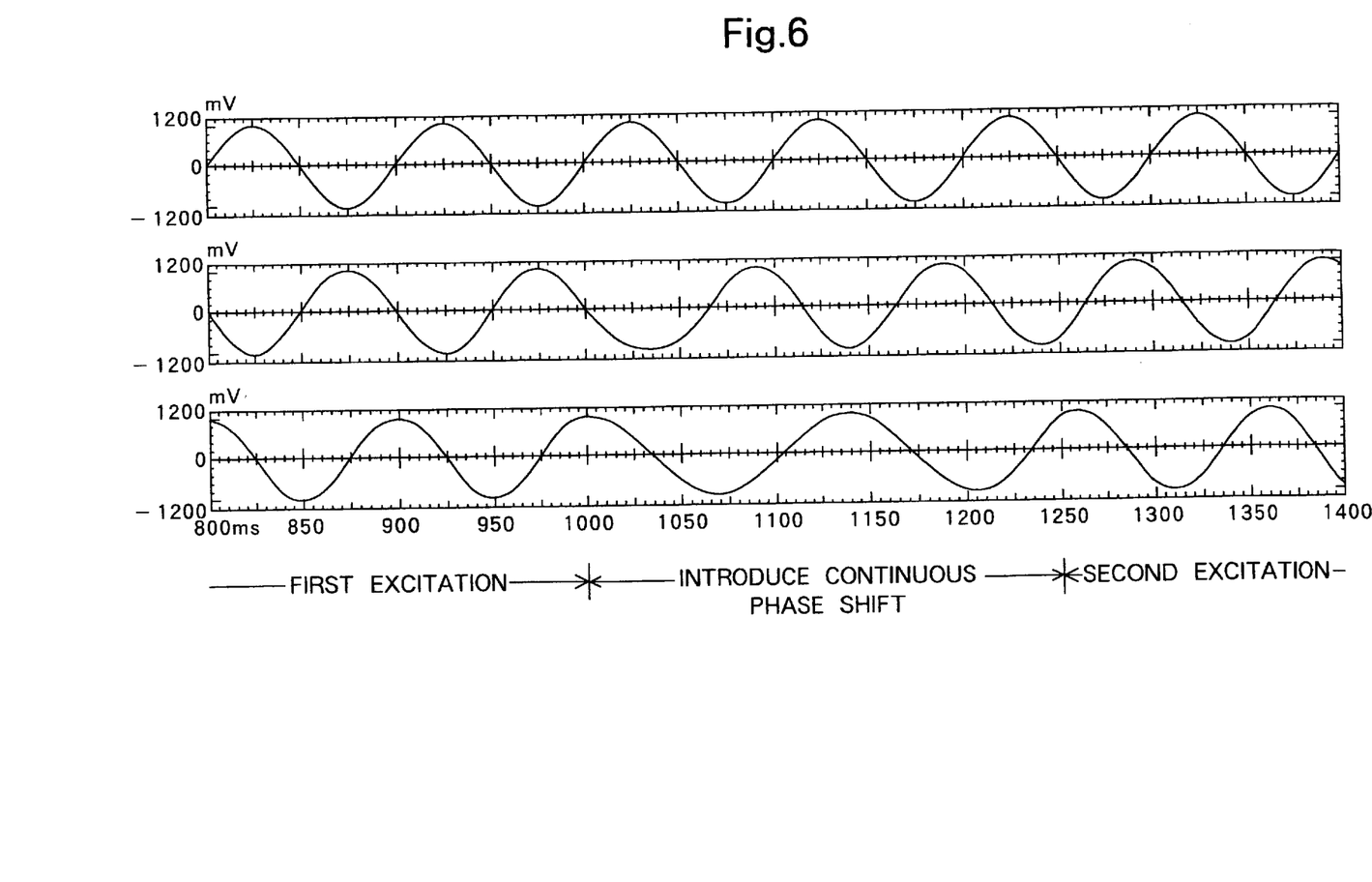
FIG. 6 is a waveform diagram showing the input signals at the time of introducing a continuous phase shift between the end of the first excitation and the start of the second excitation.

It is noted that the measurements of the transfer functions of the averaged number of times may be performed while stopping the excitations of the vibrators 2 to 4 at each excitation, but should preferably be moved to the measurements with the following condition, while performing the continuous phase shift without stopping the excitations of the vibrators, to shorten the measuring time. It is then preferable to limit the phase shift speed to a predetermined value or below, in consideration of the safety, such as prevention of damage, of the vibration testing apparatus A. FIG. 6 shows one example of the input signals at the time of introducing a continuous phase shift between the end of the first excitation and the start of the second excitation at the limited phase shift speed of 17 radian/sec or below.

The inventive method of measuring a transfer function matrix of a system to be controlled is applicable not only to the vibration testing apparatus A according to the 1st embodiment but also to other various types of multi-degree of freedom vibration testing apparatuses, and is particularly effective for the multi-degree laving freedom sine-wave vibration test on a system to be controlled having strong nonlinearity.

Figure 7:
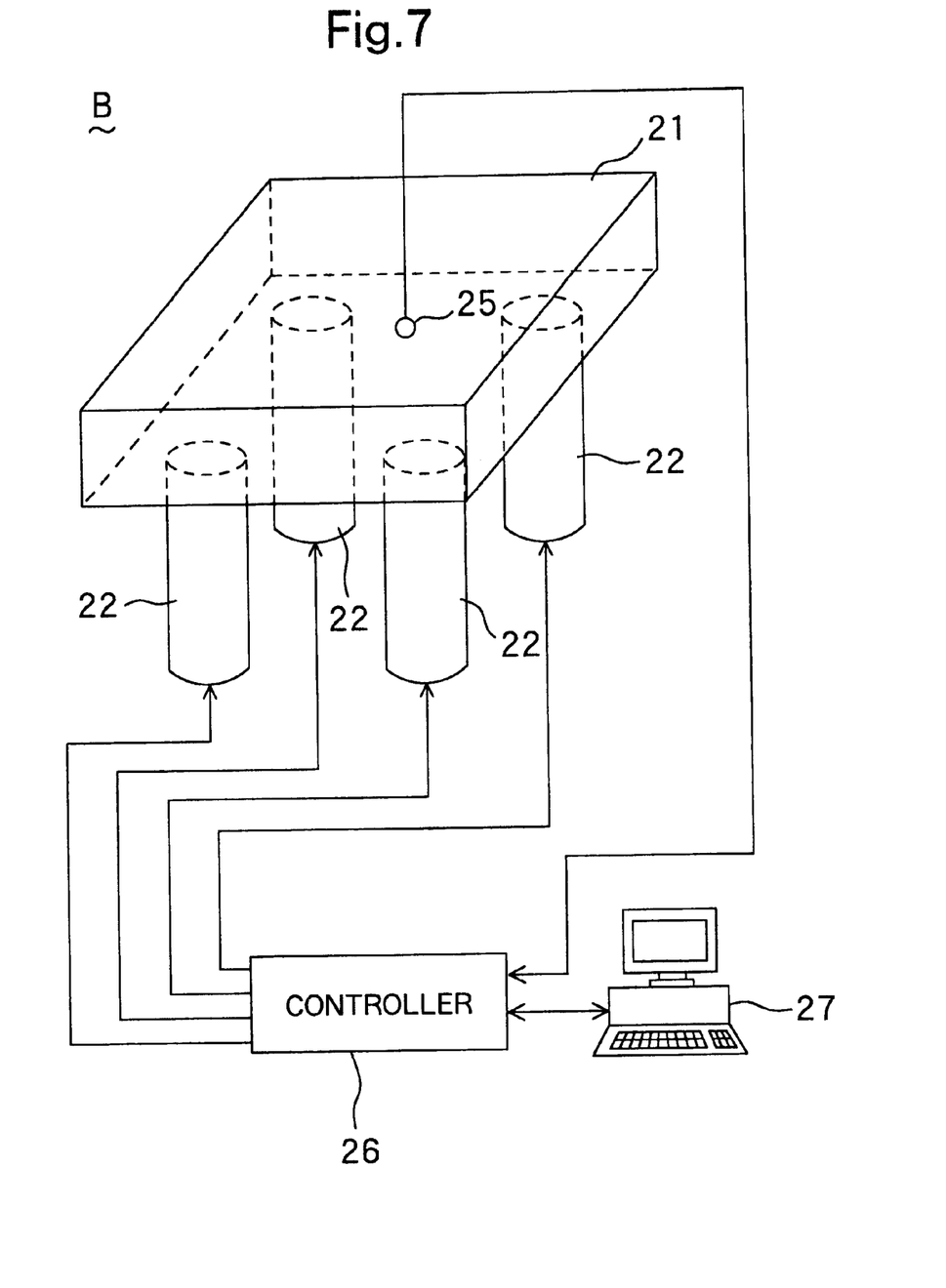
FIG. 7 is an equivalent of FIG. 1, showing the second embodiment of the invention.

FIG. 7 shows one example of the present invention applied to another vibration testing apparatus B as the second embodiment of the present invention. The vibration testing apparatus B comprises four vibrators 22, 22, . . . for applying excitations to a test object 21 in a vertical direction thereof; a vibration sensor 25 provided at a predetermined point on the test object 21; a controller 26 for receiving response signals from the vibration sensor 25 to control the vibrators 22; and a personal computer 27 connected with the controller 26 in a signal receivable relation.

While the preferred embodiments of the invention have been described, it is to be understood that various changes and modifications may be made in the invention without departing from the sprit of the present invention. The scope of the invention, therefore, is to be determined solely by the following claims.

What is claimed is:

1. A measuring system for measuring a transfer function matrix of a system to be controlled by applying sine-wave excitations to a test object simultaneously by multiple number of vibrators, said measuring system comprising:

a sine-wave signal generating part in which when sine-wave signals for driving said multiple number of vibrators are generated, phases between said sine-wave signals are randomly shifted;

at least one sensor for acquiring response signal at a response point when said multiple number of vibrators are simultaneously excited under said sine-wave signals generated in said sine-wave signal generating part;

a spectrum calculating part for calculating an auto-spectrum and a cross-spectrum for one calculation from spectral data on a vibration frequency obtained from an analysis of said sine-wave signals and said response signals acquired by said sensor;

a spectrum storing part in which said auto-spectrum and said cross-spectrum calculated in said spectrum calculating part are stored in sequence;

an arithmetic mean processing part in which said auto-spectra and said cross-spectra for two or more calculations stored in sequence in said spectrum storing part are each arithmetically averaged to find a mean value of said auto-spectra and a mean value of said cross-spectra;

a transfer function matrix calculating part in which a transfer function matrix at a specific frequency is calculated from said mean value of said auto-spectra and said mean value of said cross-spectra as found in said arithmetic mean processing part; and a transfer function matrix data storing part in which said transfer function matrix data at specific frequencies calculated in said transfer function matrix calculating part are stored in sequence, to calculate said transfer function matrix at all frequency components.

2. The measuring system of claim 1, wherein when said phases between said sine-wave signals for driving said vibrators are continuously shifted without stopping excitations of said vibrators, said sine-wave signal generating part operates to limit a speed of said phase shift to a predetermined value or below.

3. The measuring system of claim 2, wherein said predetermined value is 17 radian/sec.

4. The measuring system of claim 1, wherein when said transfer function matrix data at specific frequencies are stored in series to calculate said transfer function matrix data at all the frequency components, said transfer function matrix data are calculated at each predetermined frequency interval.

5. The measuring system of claim 1, wherein said multiple number of vibrators are at least three vibrators for each applying excitation to said test object in triaxial directions orthogonal to each other.

6. The measuring system of claim 5, wherein said sensors acquire triaxial vibrations orthogonal to each other for measurement.

7. The measuring system of claim 1, wherein said multiple number of vibrators each apply excitation to said test object in the same direction.

8. A measuring method for measuring a transfer function matrix of a system to be controlled by applying sine-wave excitation to a test object simultaneously by multiple number of vibrators, said measuring method comprising the steps:

randomly shifting phases between sine-wave signals for driving said vibrators when said sine-wave signals are generated;

simultaneously exciting said multiple number of vibrators under said generated sine-wave signals;

calculating an auto-spectrum and a cross-spectrum for one calculation from spectral data on a vibration frequency obtained from an analysis of said sine-wave signals and response signals acquired during said excitations;

repeating these steps two or more times to calculate said auto-spectra and cross-spectra for two or more calculations, followed by arithmetically averaging these spectrums to find a mean value of the auto-spectra and a mean value of the cross-spectra;

calculating said transfer function matrix at a specific frequency from said both mean values; and repeating the steps up to this point at each frequency to calculate said transfer function matrix at all frequency components.

* * * * *